United States Patent Office 2,768,120
Patented Oct. 23, 1956

2,768,120

FILTRATION PROCESS

Kornelis Rietema, Amsterdam, Netherlands, assignor to Shell Development Company, Emeryville, Calif., a corporation of Delaware No Drawing. Application July 7, 1953,
Serial No. 366,623

Claims priority, application Netherlands,
September 19, 1952

9 Claims. (Cl. 196—19)

The present invention relates to a method of minimizing the liquid content of a filter cake and more particularly to the expulsion of liquid from a wet compressible filter cake by the compression thereof by a novel method while it is on a filter element.

The drying of a filter cake on a filter element, either directly after the filtration of a slurry or after washing of the cake with a liquid, has long been a problem, particularly in the case of compressible filter cakes. It is always desirable to reduce the liquid content of the cake to as low a value as economically practicable, because any liquid remaining therein defeats, to that extent, the purpose of the filtration, viz., the separation of liquid from solid dispersed therein.

Several methods and devices have been used in the attempt to accomplish this purpose. For example, a filter cake is often dried with a gas, such as air, after the filtration of the solid-liquid dispersion is completed. Ordinarily, this will be only partially effective, because the gas will quickly find paths of least resistance through the cake. From that point on the bulk of the cake will be by-passed and little further expulsion of liquid will be accomplished. Another method which has been used in the case of rotary filters is the application of a cake-compression belt or cake-compression rollers. These devices operate to compress the cake, thus expelling liquid remaining therein. However, they introduce inherent problems of mechanical maintenance and replacement and generally have no application except in the case of rotary filters. A still further method of reducing the liquid content of a cake before its removal from a rotary filter element is the use of "flappers," whereby the cake is struck in a regular succession of blows. This causes a rearrangement of particles in the cake, closing cracks and liberating liquid which is drawn through the filter element by means of a drying gas. This device is not extensively used because of its high maintenance costs and its applicability to only a small variety of filter cakes.

The problem of reducing the liquid content of filter cakes has been studied in connection with the filtration of innumerable industrial and chemical materials. For example, in the dewaxing of lubricating oils to produce oils of low pour points, the wax is precipitated from the oil or oil-solvent solution by chilling and is subsequently removed by filtration. The resulting wax filter cakes are porous and compressible, and contain large quantities of oil. This oil is usually recovered by washing the filter cake with a solvent. This step, however, requires the removal of even larger quantities of solvent from the dewaxed oil, and the washed filter cake still retains large quantities of solvent. It is then necessary to separate the wax cake and occluded solvent in still another processing step. Frequently, distillation is used to separate both the oil-solvent solution and the wax-solvent mixture. It is readily apparent that a reduction of the liquid content of the wax cake will result in large savings in subsequent processing steps.

It is, therefore, the primary object of the present invention to provide an efficient and economical method for the reduction of the liquid content of compressible filter cakes before their removal from the filter element. A further object is to provide an improved method of applying a compressing force upon a compressible filter cake, whereby occluded liquid is expelled therefrom. A still further object is to provide an improved process for the de-oiling of a wax filter cake obtained in the filtration dewaxing of lubricating oils. Other objects will be apparent in the following description and discussion of the invention.

In accordance with the present invention, it has been found that the drying of a compressible filter cake before its removal from the filter element is greatly facilitated by depositing on the free surface thereof a relatively less pervious secondary layer of solid material and subsequently applying, or continuing to apply, by fluid means, a differential pressure across the filter cake.

By the term "compressible filter cake" is meant one for which "$s$" is greater than 0 and preferably greater than 0.2, particularly is from 0.5 to 0.8, in the equation:

$$\alpha = \alpha' P^s$$

where, in consistent units, $s$ = cake compressibility, varying from 0 for rigid, incompressible cakes such as fine sand and kieselguhr, to 1.0 for very highly compressible cakes.
$\alpha$ = average specific cake resistance.
$\alpha'$ = a constant determined largely by the size of the particles forming the cake.
$P$ = total pressure drop through the filter element and the cake upon it.

For a more detailed explanation of these terms and how they are used in filtration calculations, one may refer to Perry, J. H., "Chemical Engineers' Handbook," third edition, p. 965, New York, McGraw-Hill Book Co., Inc., 1950.

The secondary layer deposited on the primary cake may be called the "cover-cake." It can be of any material which, in the form in which it is deposited, has an average specific resistance, $\alpha$, at least 5 times that of the primary cake, and preferably 20 times.

The cover-cake is applied in the form of a particulate solid or semi-solid material dispersed in a fluid. On application of this dispersion to the primary cake, while the primary cake is still on the filter element, the fluid will pass through the primary cake and filter element and the cover-cake is left in the form of a layer on the upstream face of the primary cake. In the usual case, this will be a discrete layer, but the purposes of the invention will be accomplished even with extensive commingling of the two solid materials at the interface.

After the cover-cake has been so deposited on the primary cake, a differential pressure is applied across the two layers in order to effect a compression of the primary cake and thus reduce its porosity. This differential pressure can be applied by raising the pressure on the upstream side of the total cake such as by introducing a gas or liquid into the filter under pressure, or alternatively, a vacuum may be applied to the downstream side of the filter element. In either case, the differential pressure across the cover-cake will result in a compressive force against the total primary cake which is greater than any such force in the absence of the cover cake at the same total differential pressure. The mechanism of this action is better understood by a consideration of the distribution of a certain total pressure drop across the total filter cake and comparing the two cases: (1) without a cover-cake, and (2) with a cover-cake.

In the first case, without a cover-cake, the incremental pressure drop across the cake increases at an accelerating rate from the upstream face, or free surface, of the cake to the filter element. This is because the total compressive force on an incremental layer of the cake is equal to the fluid pressure drop from the face of the cake to the incremental layer, times the area of the incremental layer, and in the case of a compressible cake, the greater is the compressive force on an incremental layer, the greater will be the resistance to fluid flow through that incremental layer. The net result in this case is that the surface of the cake next to the filter element will be highly compressed and will absorb the major proportion of the total pressure drop across the total cake, while the bulk of the cake will be hardly compressed at all and will absorb only a small proportion of the total pressure drop.

In the second case, with a cover-cake in accordance with the present invention, the cover-cake will absorb the greater proportion of the total pressure drop across the total cake because of its much higher average specific resistance. This results in a high compressive force over the entire primary cake. Thus, the bulk of the primary cake, hardly compressed at all in the first case, will in this case be greatly compressed, its porosity will be reduced and occluded liquid will thereby be forced out of it.

It is readily apparent that for the purposes of this invention, either a gas or a liquid will be effective as the medium for the introduction of the cover-cake material onto the filter, and either will be effective as the medium for the imposition of the compressing differential pressure. The differential pressure may be held constant during both the introduction of the cover-cake material and the compression of the cake, or it may be raised during the latter stage to maximize the compression of the cake. It will frequently be preferable to use a gaseous medium for the imposition of the compressing differential pressure, because the passage of the gas through the cake will promote the drying thereof. However, in many cases, it may be desirable to use a liquid and forego this additional effect because of facilities available, character of the cake or other considerations.

The present invention is applicable and advantageous in nearly all kinds of filtration equipment, e. g., plate and frame presses, leaf filters and rotary filters, whether the filtration process is continuous or intermittent and whether the valued component of the original material filtered is the filter cake or the filtrate or both. However, it will be evident that if the primary cake is a valued product, the cover-cake material must be so selected that it will not materially adulterate the primary cake for the uses anticipated for it, or alternatively, the cover-cake material must be readily removable from the primary cake by mechanical means, such as a knife blade on a rotary filter, or by a subsequent physical or chemical separation step.

The selection of the cover-cake material will be made primarily on the basis of the specific resistance required as already defined. Other criteria, which will be completely obvious to those practiced in the art, include chemical compatability, availability and reasonable price in relation to the value of the materials to be filtered, etc. A wide variety of materials are suitable, and particularly include hydrocarbon waxes, especially isoparaffinic and naphthenic waxes and malcrystalline, microcrystalline, amorphous and ceresin waxes. Another type of suitable cover-cake material is high molecular weight polymers or resinous materials which can be dispersed in a particulate form in a gas or liquid. An example of this application is the formation of a cover-cake on the primary cake by spraying thereon a material originally in liquid form but which polymerizes or becomes plastic on contact with the fluid (e. g., air, solvent, etc.) behind the primary cake, or which solidifies when its temperature is reduced by contact with said fluid. It will be advantageous to apply this variation of the invention particularly when it is desired to seal the surface of the primary cake completely. In such a case a maximum compressive force on the primary cake is obtained with a given differential pressure across the cake.

Certain clays are also very suitable as cover-cakes in the process of the present invention. The operable clays are those which will form a filter cake of high specific resistance in the presence of the fluid in which they are suspended for application to the primary cake. Bentonite is a particularly preferred clay. Especially in the presence of water, bentonite forms a solid mass that is highly resistant to any flow of fluid therethrough. Example II, below, illustrates this application.

A particularly preferred embodiment of the present invention is the combination of the compressing effect of a clay cover-cake on a hydrocarbon wax filter cake with the subsequent use of the same clay for decolorizing the wax cake. For this purpose, after the compression of the primary wax cake has been accomplished, it is only necessary to heat the combined cakes to decolorizing temperatures (usually somewhat above the melting point of the wax) and thereafter separate the decolorized and melted wax from the clay by settling, filtration, centrifugation or the like. Mixtures or bentonite and a decolorizing earth such as Attapulgus clay are particularly advantageous. The ratio of bentonite to decolorizing earth may vary from 0.1 to 10. Example III, below, is an illustration of this application.

The quantity, or thickness, of the cover-cake which is necessary for the practice of the invention will be determined by its average specific resistance as compared to that of the primary cake. The fluid pressure drop across the cover-cake must be a significant part of the total pressure drop across both cover-cake and primary cake, and preferably is a major part of that total pressure drop, that is, 50% or more. Thus, once the cover-cake material is tentatively selected, its required thickness can readily be calculated from the thickness of the primary cake and the average specific resistances of the two cakes.

A particularly advantageous application of the present invention is in the filtration dewaxing of lubricating oils. The wax cake obtained in the usual dewaxing process contains large quantities of oil or solvent or both, even after prolonged blowing with a drying gas such as air. The liquid content of the wax cake may be considerably reduced before its removal from the filter element by the application, in accordance with the present invention, of a secondary layer of wax which has a higher average specific resistance than that of the primary wax cake. The resulting mixture of wax is frequently fully as useful a wax product as would be the primary wax cake alone because of the relatively small amount of secondary wax material. If it is desired, however, the secondary wax cake may be separated in a subsequent step. The process of the invention in this application is particularly successful when the primary wax cake is predominately normal paraffinic.

The following examples are given in order to show particular applications of the invention, but are not to be considered as being limitations on its scope.

*Example I*

In order to dewax a paraffinic Tandjung oil distillate, 10 parts by weight of distillate were diluted with 40 parts by weight of methylisobutyl ketone; the mixture was first heated to 70° C. and then slowly cooled to room temperature. By this means a paraffin wax suspension was formed which contained 4 parts by weight of solid paraffin wax (chiefly normal paraffins). The suspension was filtered off through a flat filter at a differential pressure of 60 cm. Hg. After washing out with 15 parts by weight of methylisobutyl ketone and drying by suction, a paraffin wax cake was obtained with a porosity of 85% and a liquid to solid paraffin wax ratio of 2.85:1.

According to the invention 5 parts by weight of a not readily filterable wax suspension was then deposited on a wax cake prepared in the manner described above, before the drying by suction. This suspension was obtained by mixing 1 part by weight of an oil raffinate containing isoparaffins with 4 parts by weight of methylisobutyl ketone, heating the mixture to 70° C. and then cooling it to room temperature. The rate of filtration of this suspension was (for a cake of the same thickness and at the same differential pressure) approximately 40 times lower than that of the primary suspension.

By filtration under the same differential pressure of 60 cm. Hg, a wax cake was now obtained with a porosity of 67% and a liquid to solid paraffin wax ratio of 2:1. Consequently, a 30% improvement was obtained by proceeding in accordance with the invention. By gradually increasing the pressure on the filter cake, the result is considerably improved.

*Example II*

A paraffinic oil distillate was dewaxed by bringing it into contact with an aqueous auxiliary phase in the presence of a surface-active substance. This caused the formation of an aqueous paraffin wax suspension which contained 5% by weight of solid paraffin wax. The suspension was suction-dried on a flat filter at a differential pressure of 60 cm. Hg. The cake thus obtained showed a 70% porosity and a liquid to solid wax ratio of 1.5:1.

According to the invention, a suspension of decolorizing earth and bentonite in water was brought into contact with a similar cake after filtering off but before suction-drying. After filtration and suction-drying at a differential pressure of 60 cm. Hg, a cake was obtained with a porosity of 42% and a liquid to solid paraffin wax ratio of 0.73:1. This, therefore, represents an improvement of 52%.

*Example III*

When a wax cake and the clay cover-cake deposited upon it (containing decolorizing earth and bentonite), such as those contained after the filtration and drying steps of Example II, are heated before separation to a temperature of 70 to 100° C., the wax is melted and the clay mixture is dispersed therethrough. Upon filtration, the resulting clay-free wax has a color considerably lighter than that obtained when the wax and clay cakes are separated before heating. The wax deoiled and decolorized by this method has a color in the order of 15 to 25 Saybolt, whereas the deoiled wax separated from the clay cover-cake at low temperatures has a color in the order of 2 to 5 NPA.

I claim as my invention:

1. A process of decreasing the liquid content of a compressible filter cake which comprises depositing and maintaining on a free surface of said cake a layer of particulate solid material having a specific resistance at least five times the specific resistance of said cake and imposing a differential pressure across said layer and said cake.

2. In a process of filtering wax from a liquid suspension thereof, the improvement comprising decreasing the liquid content of a waxy filter cake therefrom by depositing and maintaining on a free surface thereof a layer of particulate solid material having a specific resistance at least five times that of said cake and imposing a differential pressure across said layer and said cake.

3. In the process of dewaxing a waxy lubricating oil by chilling to precipitate the wax therein and filtering the resulting suspension, the improvement comprising reducing the liquid content of the resulting wax filter cake by depositing and maintaining on a free surface thereof a layer of particulate solid material having a specific resistance at least five times that of said cake and imposing a differential pressure across said layer and said cake.

4. The process of claim 2 wherein the wax filter cake is essentially paraffinic and the solid material deposited on the surface of the wax filter cake is a second wax of an essentially non-normal paraffinic character.

5. The process of claim 4 wherein the solid material deposited on the surface of the wax filter cake is a microcrystalline wax.

6. The process of claim 4 wherein the solid material deposited on the surface of the wax filter cake is an isoparaffin wax.

7. In the process of solvent dewaxing a paraffinic waxy lubricating oil by chilling a solution of an oil solvent and the waxy oil to precipitate the paraffin wax therein, filtering the resulting suspension and washing the resulting filter cake on the filter element with additional oil solvent, the improvement comprising reducing the liquid content of the washed paraffin wax filter cake on the filter element by applying to said cake a suspension of predominately isoparaffin wax in an oil solvent whereby a layer of said isoparaffin wax is deposited and maintained on the free surface of the paraffin wax filter cake and maintaining a differential pressure across the filter cake for a short period of time after said suspension has been completely filtered.

8. In a process of filtering wax from a liquid suspension thereof with the production of a waxy filter cake deposited on a filter surface, the improvement comprising decreasing the liquid content of the waxy filter cake by depositing on a free surface thereof a layer of a particulate clay having a specific resistance of at least five times that of said cake and imposing a differential pressure across said layer and said cake.

9. In a process of filtering wax from a liquid suspension thereof with the production of a waxy filter cake deposited on a filter surface, the improvement comprising decreasing the liquid content of the waxy filter cake by depositing on a free surface thereof a layer of a particulate mixture of decolorizing earth and bentonite having a specific resistance of at least five times that of said cake, imposing a differential pressure across said cake and said layer and heating the wax so recovered with the decolorizing earth and bentonite whereby the wax is decolorized prior to separation from the earth and bentonite.

References Cited in the file of this patent

UNITED STATES PATENTS

| | | |
|---|---|---|
| 817,252 | Kneuper | Apr. 10, 1906 |
| 1,927,057 | Anderson | Sept. 19, 1933 |
| 2,053,872 | Montgomery et al. | Sept. 8, 1936 |
| 2,229,582 | Merrill | Jan. 21, 1941 |
| 2,248,498 | Gross et al. | July 8, 1941 |
| 2,518,365 | Pattillo | Aug. 8, 1950 |
| 2,612,465 | Kiersted et al. | Sept. 30, 1952 |